(12) United States Patent
Soh et al.

(10) Patent No.: US 8,342,415 B2
(45) Date of Patent: Jan. 1, 2013

(54) METHOD OF CONDUCTING A TRANSACTION USING AN NFC DEVICE

(75) Inventors: Kian Teck Soh, Singapore (SG); Jean-Bernard Blanchet, Aix en Provence (FR)

(73) Assignee: Inside Secure, Aix-en-Provence Cedex (FR)

( * ) Notice: Subject to any disclaimer, the term of this patent is extended or adjusted under 35 U.S.C. 154(b) by 190 days.

(21) Appl. No.: 12/725,933

(22) Filed: Mar. 17, 2010

(65) Prior Publication Data
US 2011/0226853 A1    Sep. 22, 2011

(51) Int. Cl.
G06K 19/06 (2006.01)
G06K 7/08 (2006.01)
H04B 5/00 (2006.01)

(52) U.S. Cl. .................... 235/492; 235/451; 455/41.1
(58) Field of Classification Search .................. 235/451, 235/379, 380, 375; 455/41.1–41.3; 340/10.1, 340/10.3, 10.4, 572.1, 572.4
See application file for complete search history.

(56) References Cited

U.S. PATENT DOCUMENTS

| | | | | |
|---|---|---|---|---|
| 5,811,771 A * | 9/1998 | Dethloff | | 235/380 |
| 5,892,211 A * | 4/1999 | Davis et al. | | 235/380 |
| 6,157,966 A * | 12/2000 | Montgomery et al. | | 710/8 |
| 6,942,147 B2 * | 9/2005 | Lahteenmaki et al. | | 235/441 |
| 2007/0090195 A1 * | 4/2007 | Kawamura et al. | | 235/492 |
| 2007/0263595 A1 * | 11/2007 | Charrat | | 370/351 |
| 2007/0263596 A1 * | 11/2007 | Charrat | | 370/351 |
| 2008/0006695 A1 | 1/2008 | Morita | | |
| 2008/0085001 A1 * | 4/2008 | Charrat et al. | | 380/247 |
| 2008/0136599 A1 * | 6/2008 | Sugano et al. | | 340/10.1 |
| 2008/0137862 A1 * | 6/2008 | Morita et al. | | 380/270 |

OTHER PUBLICATIONS

FR Search Report issued Nov. 16, 2010 in FR Application No. 1000871.

* cited by examiner

*Primary Examiner* — Michael G Lee
*Assistant Examiner* — Suezu Ellis
(74) *Attorney, Agent, or Firm* — Panitch Schwarze Belisario & Nadel LLP

(57) ABSTRACT

The invention relates to a method of conducting a transaction between an NFC device and a contactless integrated circuit of the passive reader type. The method includes providing, in the contactless integrated circuit, at least one reader application emulation program and, by an intermediary unit of the NFC device, establishing a communication with the contactless integrated circuit, receiving from the contactless integrated circuit reader application commands and transferring the commands to the first host processor, and receiving card application responses supplied by the first host processor and transferring the responses to the contactless integrated circuit.

8 Claims, 6 Drawing Sheets

METHOD OF CONDUCTING A TRANSACTION USING AN NFC DEVICE

BACKGROUND OF THE INVENTION

Embodiments of the present invention relate to contactless transactions conducted using a Near Field Communication (NFC) controller coupled to at least one host processor.

NFC technology is currently being developed by an industrial consortium grouped under the name "NFC Forum" (http://www.nfc-forum.org). NFC technology is derived from Radio Frequency Identification (RFID) technology and uses NFC controllers having several operating modes, in particular a Reader mode and a Card Emulation mode.

FIG. 1 shows an NFC device generally termed "NFC chipset" including an NFC controller NFCC and at least one host processor HP1 linked to the controller NFCC by a bus BS1, for example of the Single Wire Protocol (SWP) type. The host processor may take the form of an integrated circuit designated Universal Integrated Circuit Card (UICC), such as a Subscriber Identity Module (SIM) card. The host processor may also be the baseband processor of a mobile telephone (that is, the processor in charge of telephonic communications). The resources of the controller NFCC are available to the host processor HP1 to allow it to manage contactless applications. The controller NFCC includes a host controller HC and a contactless interface CLF ("Contactless Front End Interface") equipped with an antenna coil AC1. In practice, the host controller HC and the interface CLF may be made on the same semiconductor chip, such as the MicroRead® chip commercialized by the applicant, or may be two distinct chips, such as the chips "PicoRead® Microcontroller" and "PicoRead® RF Interface" commercialized by the applicant.

The interface CLF of the controller NFCC can generally operate according to several RF technologies designated RFTi in FIG. 1, for example "Type A" or "Type B", such as defined by ISO/IEC 14443 parts 2, 3, and 4; "Type B'", such as defined by ISO/IEC 14443-2 with a standard framing such as defined by ISO/IEC 14443-3; and "Type F", such as defined by ISO 18092 in passive mode at 212 and 424 kilo octets per second (kops), or by the Japanese Industrial Standard JIS X 6319-4. Each RF technology, or contactless communication protocol, defines an emission frequency of the magnetic field, a method of modulating the magnetic field to transmit data in active mode, a method of charge modulation to transmit data in passive mode, a method of data coding, a data frame format, and the like.

Due to its wide communication capabilities, such an NFC device is generally integrated in a portable device HD ("Handheld Device") such as a mobile telephone, a Personal Digital Assistant (PDA), or the like. Application examples of the NFC device are shown in FIG. 2, which shows a portable device HD equipped with the NFC device of FIG. 1, the device HD of FIG. 2 is in the form of a mobile telephone. Reader Applications RAP and Card Applications CAP may be distinguished.

Reader Applications (RAP)

The controller NFCC operates as an NFC reader to conduct a transaction with a Contactless Integrated Circuit CIC. A reader application RAPi is executed by the host processor HP1 (FIG. 1). The host processor HP1 sets the interface CLF in an active operating mode where it emits a magnetic field FLD, sends data by modulation of the magnetic field, and receives data by charge modulation and inductive coupling. This type of application may be free (for example, reading a tag containing the bus schedules at a bus stop) and may be executed by an unsecure processor. The host processor HP1 may, in this case, be the baseband processor of the mobile telephone. If it is a paid application, the host processor HP1 is preferably a secure processor (for example, a processor of a SIM card), because the access to the service requires an identification of the subscriber.

Card Applications (CAP)

The operating principle of the card emulation mode is described by the patent EP 1 327 222 (U.S. Pat. No. 7,098, 770) in the name of the applicant. A card application (CAPi) is executed by the host processor HP1 (FIG. 1). The host processor HP1 sets the controller NFCC in a passive operating mode and forms, with the controller NFCC, the equivalent of a contactless integrated circuit, which is seen by a reader RD as a contactless card. Thus, the controller NFCC does not emit a magnetic field, receives data by demodulating a magnetic field FLD emitted by the reader RD, and emits data by modulating the impedance of its antenna circuit (charge modulation). The related applications are generally applications for payment or payment access control (payment machine, subway entrance, or the like.). The portable device HD is therefore used in this case as a chip card. This type of application is most often secure, and the host processor HP1 that executes the application program is in this case a secure processor, for example a SIM card processor.

Standardized Architecture of an NFC Device

Inside the NFC device, the bus BS1 generally supports communication interfaces called HCI ("Host Controller Interface") by the intermediary of the controller NFCC and the host processor HP1 exchanging data in conformance with the Host Controller Protocol HCP. This protocol provides a routing of data according to routing channels called "pipes" described in the applications EP 1 855 229 (US 2007/0263595) or EP 1 855 389 (US 2007/0263596) in the name of the applicant.

The HCI interface and the HCP protocol are also described in the European Telecommunications Standards Institute's ETSI TS 102 622 specification entitled "Smart Cards; Universal Integrated Circuit Card (UICC); Contactless Front-end (CLF) interface; Host Controller Interface (HCI)". In addition, the commands and the responses to commands exchanged during a transaction between the host processor HP1 and an external device, such as the passive contactless integrated circuit CIC or the reader RD, are defined by the NFCForum-TS-Type-4-Tag specifications entitled "Type 4 Tag Operation". Equally, the format of data exchanged during an NFC transaction is defined by the NFCForum-TS-NDEF specifications entitled "NFC Data Exchange Format (NDEF)".

As shown in FIG. 1, these diverse specifications define an NFC device architecture wherein the controller NFCC executes one or more RFTi technologies (operating modes of the interface CLF, for example Type A, Type B, Type B', and Type F), whereas the host processor HP1 executes reader applications RAPi and card applications CAPi. Each technology RFTi is accessible by the intermediary of a Reader RF Gate RRFG or by a Card RF Gate CRFG. Each reader application RAPi includes a Reader Application Gate RAG that is connected by the intermediary of a pipe to a reader RF gate RRFG associated with a technology RFTi. Similarly, each card application CAPi comprises a Card Application Gate CAG that is connected by the intermediary of a pipe to a card RF gate CRFG associated with a technology RFTi. With each reader gate RRFG or card gate CRFG is associated a registry that contains parameters necessary for the management of the RF channel according to the technology RFTi that the reader application or the card application uses.

Commands Exchanged During the Execution of a Reader Application

During the execution of a reader application RAPi, the host processor HP1 configures the interface CLF in active mode by the intermediary of a reader application gate RAG. The reader application RAPi activates a gate RAG and requests the HCI administrator (software unit executed by the controller NFCC) to open a pipe P1 between the gate RAG and a gate RRFG associated with a desired technology RFTi. The application RAPi then emits commands CAPDU that are transmitted to the controller NFCC by the intermediary of the pipe P1, then are transmitted to the integrated circuit CIC by the intermediary of an RF channel. The contactless integrated circuit CIC sends back responses RAPDU to the controller NFCC, which the controller NFCC then transmits to the host processor HP1 via the intermediary of the pipe P1.

Commands Exchanged During the Execution of a Card Application

During the execution of a card application CAPi, the host processor HP1 emulates a passive contactless card and uses the interface CLF in passive mode. The card application CAPi activates a gate CAG and requests the HCI administrator to open a pipe P2 between the gate CAG and a gate CRFG associated with a desired technology RFTi. The reader RD sends to the controller NFCC commands CAPDU that the controller NFCC transmits to the host processor HP1 by the intermediary of the pipe P2. The host processor HP1 emits responses RAPDU that are transmitted to the controller NFCC via the intermediary of the pipe P2. The responses are then transmitted by the controller NFCC to the reader RD, by the intermediary of an RF channel.

The commands CAPDU and the responses RAPDU (generally designated "C-APDU" and "R-APDU") are defined by the standard ISO 7816-4 and are detailed at point 5 of the "Type 4 Tag Operation" specification.

In summary, the host processor HP1 emits commands CAPDU when operating in reader mode and conducts a transaction with a contactless integrated circuit CIC, and the contactless integrated circuit CIC sends back responses RAPDU to the host processor HP1. Inversely, when operating in card emulation mode, the host processor HP1 receives commands CAPDU emitted by a reader RD and sends back responses RAPDU to the reader RD.

It is known that the development of NFC technology is closely linked to the development of applications of the card emulation type, which allow for the use of a portable device HD as a contactless chip card. Even though infrastructures equipped with NFC readers already exist, in particular in the domain of access control, these infrastructures are rare and are not developing at a sufficient rate to allow for the desired development of NFC technology. In particular, a constraint that is impeding the development of NFC infrastructures is the cost of NFC readers themselves, as well as the cost of their installation in the application areas. As a reader is an active device that emits a magnetic field, it presents a certain complexity and non-negligible cost, and must be linked to an electrical power supply.

It may therefore be desired to provide a method of conducting an NFC transaction and an NFC system that allows for the implementation of card applications without the constraint of requiring the installation of a group of readers.

BRIEF SUMMARY OF THE INVENTION

The present invention includes the observation that, during a transaction in card emulation mode, the NFC controller does not use the resources of the contactless interface CLF for the emission of a magnetic field. It may therefore be considered that a transaction conducted between an NFC reader in active mode and an NFC controller in passive mode represents a "waste" of resources, because each of these two elements has the capability of emitting a magnetic field, but those of the NFC controller not being used.

Based on this observation, embodiments of the invention relate to a method of conducting a transaction between an NFC device and a passive contactless integrated circuit. The NFC device includes an NFC controller coupled to a contactless communication interface, and at least a first host processor comprising at least one card application program. The method includes: providing, in the contactless integrated circuit, at least one reader application emulation program configured to supply first reader application commands and to treat first card application responses; setting, by means of an intermediary unit of the NFC device, the contactless communication interface in an active mode to emit a magnetic field and establish a communication with the contactless integrated circuit; receiving, from the contactless integrated circuit, first reader application commands and transferring them to the first host processor; and receiving, from the first host processor, first card application responses and transferring them to the contactless integrated circuit.

In one embodiment, the method includes: providing, in the intermediary unit, a first protocol inversion program; providing, in the contactless integrated circuit, a second protocol inversion program configured to cooperate with the reader application emulation program; establishing, between the first and the second inversion programs, a contactless communication wherein the intermediary unit acts as a reader relative to the contactless integrated circuit; and, by the intermediary of the second and the first inversion programs, transferring to the first host processor, first reader application commands supplied by the reader application emulation program; and transferring to the reader application emulation program, first card application responses supplied by the card application of the first host processor.

In one embodiment, the method includes the following steps, conducted by the intermediary unit: receiving, from the first host processor, first card application responses, encapsulating the responses in second reader application commands, and transferring the second reader application commands to the contactless integrated circuit; and receiving from the contactless integrated circuit first reader application commands encapsulated in second card application responses, de-encapsulating the first reader application commands, and transferring the de-encapsulated commands to the first host processor.

In one embodiment, the first reader application commands emitted by the reader application emulation program and the first card application responses emitted by the card application program are in the APDU ISO 7816 format.

In one embodiment, the second reader application commands and the second card application responses are in the APDU ISO 7816 format.

In one embodiment, the method includes supplying to the first host processor, via the intermediary unit, HCI interface commands that cause the first host processor to perceive the first reader application commands received from the contactless integrated circuit as having been emitted by an NFC reader in the active mode.

In one embodiment, the method includes recording in a registry at the disposal of the first host processor, RF channel parameters that cause the first host processor to perceive the first reader application commands received from the contactless integrated circuit as having been emitted by an NFC reader in the active mode.

In one embodiment, the intermediary unit is a host controller of the NFC device.

In one embodiment, the intermediary unit is a second host processor of the NFC device.

Embodiments of the invention also relate to a contactless integrated circuit of the passive type arranged, or to be arranged on or within a fixed or portable support. The integrated circuit includes an NFC reader emulation program, and being configured to supply first reader application commands and to treat first card application responses received in response to reader application commands.

In one embodiment, the integrated circuit includes a protocol inversion program configured to respond to second reader application commands and to supply second card application responses, and at least one reader application emulation program configured to supply the first reader application commands and to treat the first card application responses.

In one embodiment, the integrated circuit is configured to receive first card application responses encapsulated in second reader application commands, and to encapsulate, in second card application responses, first reader application commands.

In one embodiment, the integrated circuit is configured to receive first card application responses and second reader application commands in the APDU ISO 7816 format, and to emit first reader application commands and second card application responses in the APDU ISO 7816 format.

Embodiments of the invention also relate to an NFC device including an NFC controller coupled to a contactless communication interface. A first host processor includes at least one card application program and is configured to treat first reader application commands and to supply first card application response. An intermediary unit coordinates a transaction between the host processor and a passive contactless integrated circuit of the reader type. The intermediary unit is configured to: set the contactless communication interface in an active mode where a magnetic field is emitted; receive, via the intermediary of the contactless communication interface in active mode, first reader application commands emitted by a passive contactless integrated circuit of the reader type and transfer the commands to the first host processor; and receive first card application responses supplied by the first host processor and transfer the responses, via the intermediary of the contactless communication interface in active mode, to the passive contactless integrated circuit of the reader type.

In one embodiment, the intermediary unit is also configured to emit, via the intermediary of the contactless communication interface, second reader application commands allowing for the management of a communication with a passive contactless integrated circuit of the reader type; and to receive, by the intermediary of the contactless communication interface, second card application responses emitted by a passive contactless integrated circuit of the reader type.

In one embodiment, the intermediary unit is configured to encapsulate, in second reader application commands, first card application responses supplied by the first host processor and transmit the second reader application commands via the intermediary of the contactless communication interface; and to receive, by the intermediary of the contactless communication interface, second card application responses within which are encapsulated first reader application commands, de-encapsulate the first reader application commands, and transfer the de-encapsulated commands to the first host processor.

In one embodiment, the intermediary unit is configured to transmit, via the intermediary of the contactless communication interface, second reader application commands and first card application responses in the APDU ISO 7816 format; and to receive, via the intermediary of the contactless communication interface, second card application responses and first reader application commands in the APDU ISO 7816 format.

In one embodiment, the intermediary unit is also configured to supply, to the first host processor, HCI interface commands that cause the first host processor to perceive that the first reader application commands received from a contactless integrated circuit as having been emitted by an NFC reader in the active mode.

In one embodiment, the intermediary unit is also configured to supply, to the first host processor, RF channel parameters that cause the first host processor to perceive reader application commands received from a contactless integrated circuit as having been emitted by an NFC reader in the active mode.

In one embodiment, the intermediary unit is a host controller of the NFC device.

In one embodiment, the intermediary unit is a second host processor of the NFC device.

Embodiments of the invention also relate to a portable device, including an NFC device according to the invention.

Embodiments of the invention also relate to a method of establishing a communication with an NFC device. The NFC device includes an NFC controller coupled to a contactless communication interface. At least a first host processor includes at least one card application program. The method includes: providing a contactless integrated circuit of the passive type arranged or to be arranged on or within a fixed or portable support; and configuring the contactless integrated circuit to supply the NFC controller with first reader application commands and treat first card application responses received from the NFC controller in response to reader application commands.

In one embodiment, the method comprises includes, in the contactless integrated circuit: a protocol inversion program configured to respond to second reader application commands from the NFC device and to supply the NFC device with second card application responses; and at least one reader application emulation program configured to supply the first reader application commands and to treat the first card application responses.

In one embodiment, the method includes: with the contactless integrated circuit, receiving first card application responses encapsulated in second reader application commands; and with the contactless integrated circuit, encapsulating, in second card application responses, first reader application commands.

In one embodiment, first card application responses, second reader application commands, first reader application commands and second card application responses are in the APDU ISO 7816 format.

BRIEF DESCRIPTION OF THE SEVERAL
VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
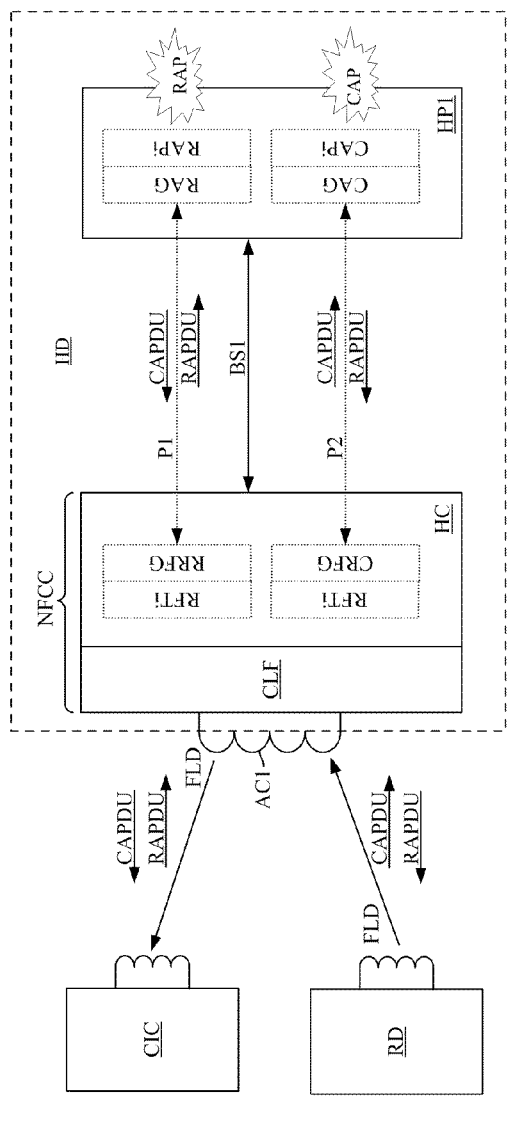
FIG. 1 shows the architecture of a conventional NFC device.
Figure 3:
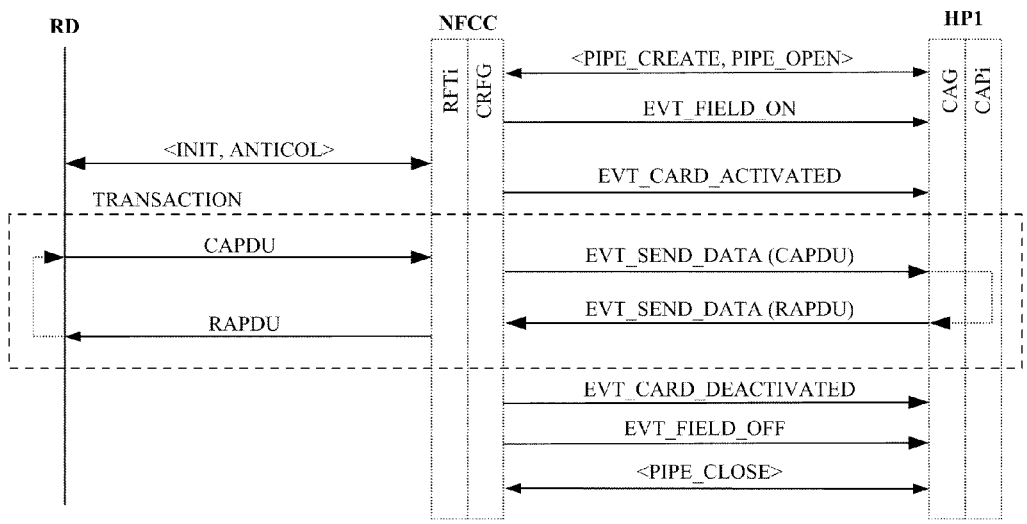
FIG. 3 shows steps of a conventional transaction between the NFC device of FIG. 1 and an external NFC reader.
Figure 4:
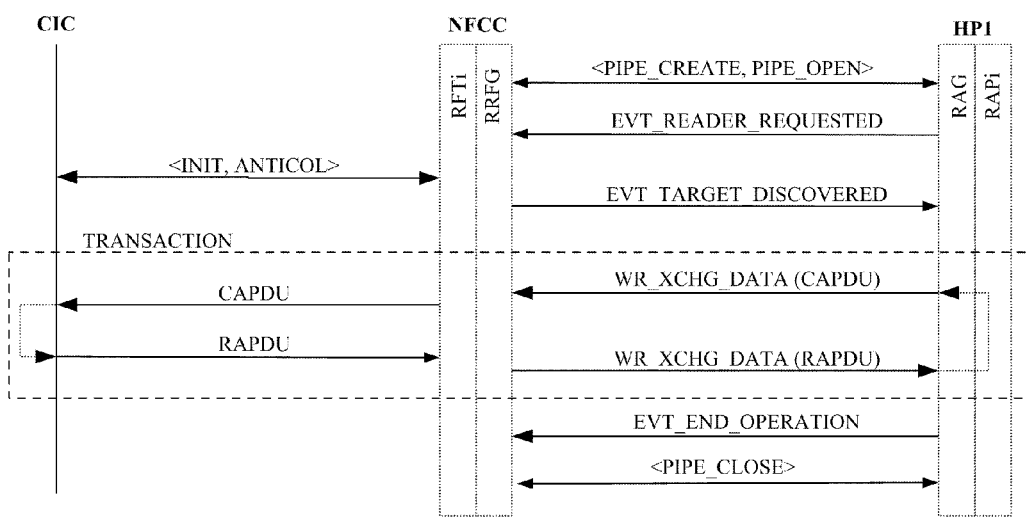
FIG. 4 shows steps of a conventional transaction between the NFC device of FIG. 1 in reader mode and a contactless integrated circuit.

FIG. 3 shows steps of a conventional transaction between the NFC device of FIG. 1 and a reader RD. FIG. 4 shows steps of a conventional transaction between the NFC device of FIG. 1 and a contactless integrated circuit CIC. The steps shown in FIGS. 3 and 4 implement standardized commands described by the specifications ETSI TS 102 622, NFCForum-TS-Type-4-Tag, and NFCForum-TS-NDEF.

Transaction in Card Emulation Mode

The transaction shown in FIG. 3 includes the following initialization steps:

A pipe P1 is created and opened between a card application CAPi executed by the host processor HP1 and a technology RFTi executed by the controller NFCC, via the intermediary of a card application gate CAG and a card RF gate CRFG (step "PIPE_CREATE, PIPE_OPEN");

The controller NFCC detects the magnetic field emitted by the reader RD and sends a command EVT_FIELD_ON to the processor HP1;

The controller NFCC conducts initialization steps of a communication with the reader RD with the creation of an RF communication channel, as well as anti-collision steps if other NFC devices or contactless cards are found in the interrogation field of the reader RD (step "INIT, ANTICOL");

When the connection with the reader RD is established, the controller NFCC sends a command EVT_CARD_ACTIVATED to the host processor HP1 to indicate to the host processor HP1 that a transaction may begin;

The transaction as such then includes the following steps:

The reader RD sends commands CAPDU, via the RF communication channel, to the processor NFCC;

The controller NFCC transmits these commands, via the intermediary of the pipe P1 and in an encapsulated form in commands EVT_SEND_DATA (command of the "event" type of the set of commands of the interface HCI defined by the ETSI specification), to the host processor HP1;

The card application CAPi of the host processor HP1 sends responses RAPDU, via the pipe P1 and in an encapsulated form in commands EVT_SEND_DATA, to the controller NFCC; and The controller NFCC transmits responses RAPDU, via the RF channel, to the reader RD.

A first command CAPDU emitted by the reader RD may be a selection command of the card application CAPi that the host processor HP1 executes, for example the command "Tag Application Select" defined at point 6.4.2 of the "Type 4 Tag Operation" specification:

| CLA | INS | P1 | P2 | Lc | Data | Le |
|---|---|---|---|---|---|---|
| 00h | A4h | 04h | 00h | 07h | D2760000850100h | — |

The transaction may be interrupted if the host processor HP1 does not respond by sending back the response SW1-SW2=9000h (hexadecimal notation).

When the transaction is finished (or interrupted), the reader RD stops emitting the magnetic field and the controller NFCC sends to the host processor HP1 a command EVT_CARD_DEACTIVATED for the deactivation of the card application and a command EVT_FIELD_OFF indicating that the magnetic field is no longer present. The pipe P1 is then closed (step "PIPE_CLOSE").

Transaction in Reader Mode

The transaction shown in FIG. 4 includes the following initialization steps:

A pipe P2 is created and opened between a reader application RAPi of the host processor HP1 and a technology RFTi of the controller NFCC, via the intermediary of a reader application gate RAG and of a reader RF gate RRFG (steps "PIPE_CREATE, PIPE_OPEN");

The reader application RAPi sends, at regular intervals, interrogation commands EVT_READER_REQUESTED aiming to detect the presence of the contactless integrated circuit CIC (interrogation method called "polling") to the controller NFCC;

When the contactless integrated circuit CIC is detected, the controller NFCC conducts initialization steps "INIT, ANTICOL" of a communication with the contactless integrated circuit CIC with the creation of an RF communication channel, and optionally anti-collision steps (if other contactless integrated circuits are present in the field);

The controller NFCC sends the command EVT_TARGET_DISCOVERED to the host processor HP1 to indicate to the host processor HP1 that a transaction can begin.

The transaction as such then includes the following steps:

The host processor HP1 sends, via the pipe P2, commands CAPDU encapsulated in commands WR_XCHG_DATA to the controller NFCC;

The controller NFCC transmits, by the intermediary of the RF channel, commands CAPDU to the contactless integrated circuit CIC;

The contactless integrated circuit CIC sends responses RAPDU to the controller NFCC;

The controller NFCC transmits, via the pipe P2, responses RAPDU encapsulated in commands WR_XCHG_DATA to the host processor HP1.

As previously, a first command CAPDU emitted by the host processor HP1 may be a selection command of the application that the integrated circuit CIC executes, for example the command described above. The transaction may be interrupted if the contactless integrated circuit CIC does not respond by sending back the response SW1-SW2=9000h (hexadecimal notation), which signifies that it does not comprise an application corresponding to the reader application that the host processor HP1 executes.

When the transaction is finished (or interrupted), the host processor HP1 sends a command EVT_END_OPERATION for closing the RF channel to the controller NFCC, and the pipe P2 is then closed (step "PIPE_CLOSE").

The commands CAPDU and the responses RAPDU (usually designated "C-APDU" and "R-APDU") are defined by the ISO 7816-4 standard. Their format is detailed at point 5 of the "Type 4 Tag Operation" specification (NFCForum-TS-Type-4-Tag). The commands CAPDU recommended by these specifications are the commands Select, ReadBinary, UpdateBinary, for example "Tag Application Select", "Capability Container Select", "NDEF Select", "Capability Container Read", "NDEF Read", "NDEF Update".

The conventional transactions of the type described above thus define a passive contactless integrated circuit as an element configured to treat commands CAPDU emitted by a reader and to supply responses RAPDU to reader application commands.

Examples of Transactions According to Embodiments of the Invention and Corresponding NFC Device Architectures An NFC transaction process according to embodiments of the invention provides a passive contactless integrated circuit of the reader RCIC type, designated for convenience as "passive contactless integrated circuit of reader type" or "passive reader" because it forms the equivalent of a reader not emitting a magnetic field. Such a passive reader is configured to supply commands of the reader type and to treat responses emitted by a host processor in card emulation mode. It is generally in the form of an integrated circuit with a microprocessor or microcontroller equipped with a contactless communication interface, a program memory (read only memory), and a data memory (random access memory), and offering a sufficient calculation capacity to emulate the operation of a reader.

An embodiment of the method according to the invention equally provides an NFC device architecture that is designed to allow a host processor of the device configured in the card emulation mode to conduct a transaction with such a passive reader.

Figure 5:
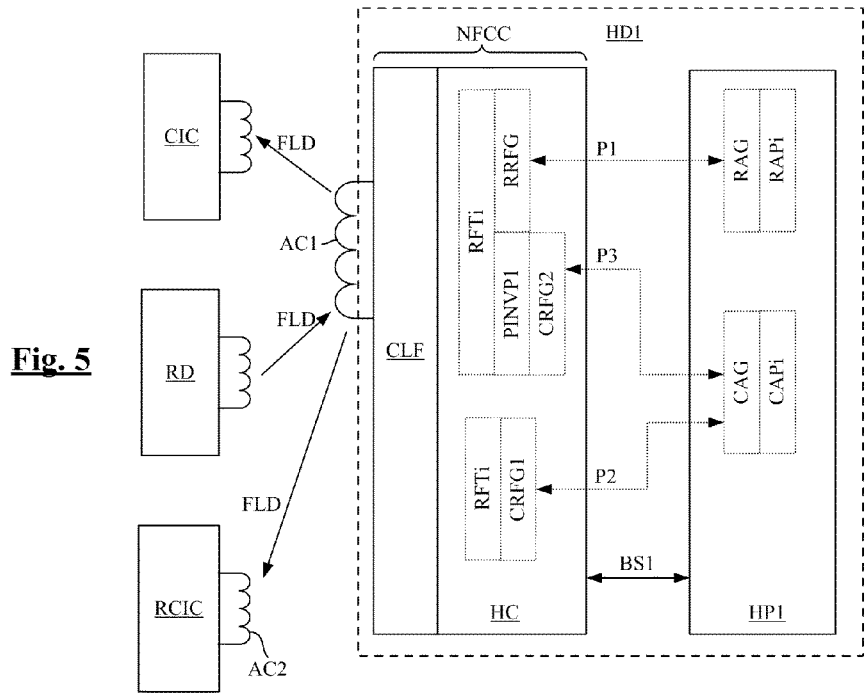
FIG. 5 shows the architecture of an NFC device according to an embodiment of the invention.

FIG. 5 shows an embodiment of such an NFC device architecture. The NFC device is susceptible of being integrated in a portable device HD such as a mobile telephone, a PDA, an active card called "sticker" (card to be glued on the back of a mobile telephone), a protective mobile telephone envelope ("skin"), or the like. The NFC device includes a controller NFCC and at least one host processor HP1 linked to the controller NFCC by a data bus BS1, for example of the Single Wire Protocol SWP type. The controller NFCC includes a contactless interface CLF equipped with an antenna coil AC1, and a host controller HC. It will be assumed here, in a non-limiting manner, that the controller NFCC presents all the functionalities of a conventional NFC controller, in particular that it implements one or more RF technologies RFTi, and that it is configured to activate a reader RF gate RRFG or a card RF gate CRFG1 to allow the host processor HP1 to execute reader applications RAPi and card applications CAPi by using these RF technologies. It will also be assumed that the host processor HP1 includes at least one card application CAPi, at least one reader application RAPi, a card application gate CAG for the card application CAPi, and a reader application gate RAG for the reader application RAPi. Thus, the NFC device may conduct a transaction with a conventional contactless integrated circuit CIC by opening a pipe P1 between the reader application RAPi and a technology RFTi, via the intermediary of gates RAG and RRFG. The NFC device may also conduct a transaction with a conventional reader RD by opening a pipe P2 between the card application CAPi and a technology RFTi, via the intermediary of gates CAG and CRFG1.

The NFCC device also includes a functionality PINVP1 that will be called in the following "protocol inversion program" or "inversion program". The inversion program PINVP1 is executed here by the host controller HC of the controller NFCC and is provided to establish a communication with a passive reader RCIC according to the invention, via the intermediary of a technology RFTi and the interface CLF. The inversion program PINVP1 is also configured to activate a card RF gate CRFG2 and to request the administrator HCI to open a pipe P3 linking the gate CRFG2 to a gate CAG of a card application CAPi of the host processor HP1, in order to transmit to the host processor HP1 commands supplied by the passive reader RCIC as if they were commands received from a true NFC reader or equivalent device, in particular another NFC device operating in reader mode. The inversion program PINVP1 is equally configured to receive from the host processor HP1 responses to such commands, and to transmit them to the passive reader RCIC.

Figure 2:
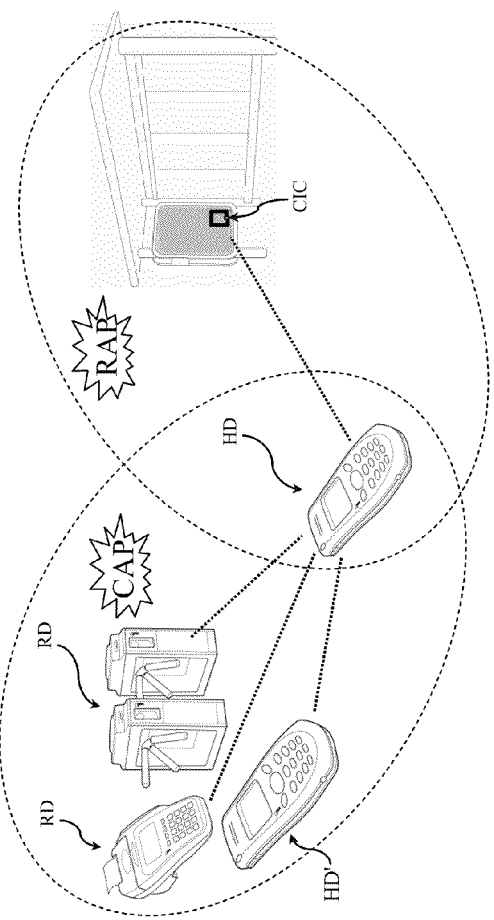
FIG. 2 shows applications of the NFC device.
Figure 6:
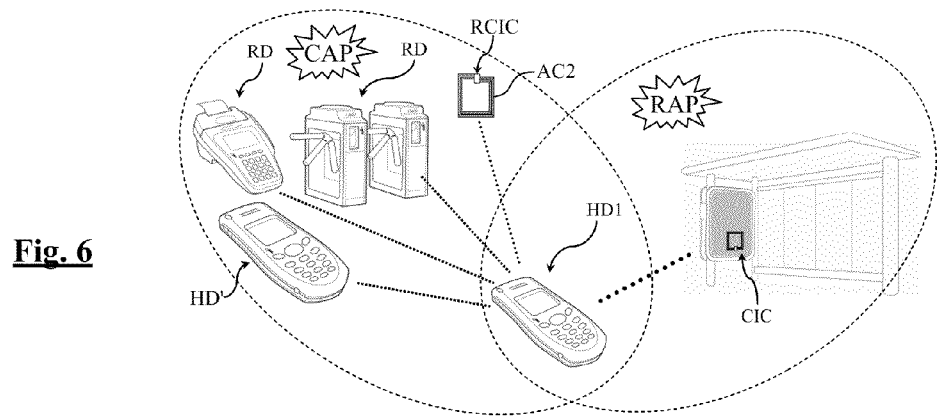
FIG. 6 shows applications of the NFC device of FIG. 5.

Application examples of the NFC device according to the invention are shown in FIG. 6, which shows a portable device HD equipped with the NFC device of FIG. 5, the device HD being here a mobile telephone. Reader applications RAP and card applications CAP of the types previously described in relation with FIG. 2 can be seen. Among the card applications CAP, a supplementary application according to the present invention can be seen, that is a transaction between the device HD1 and a passive reader RCIC.

In FIG. 6, the passive reader RCIC is shown as a chip connected to an antenna coil AC2. This ensemble, chip and antenna coil, is susceptible in practice of being integrated within or mounted on any type of portable support. It may be for example in the form of an electronic "tag", contactless card, or be directly integrated in any fixed support.

The advantage of such a passive reader RCIC is that it allows for the emulation of an NFC reader such as the reader RD shown in FIG. 5, without the inconveniencies related with the installation of a true reader. Thanks to the embodiments of the invention, it is therefore possible to install, at minimum cost, a group of "virtual readers" formed by passive readers RCIC according to the invention.

In an embodiment of the invention, it is desired that the emulation of an NFC reader by means of the passive reader RCIC is transparent for the host processor HP1, in order to ensure the compatibility of the invention with conventional host processors designed to dialogue in card emulation mode with true NFC readers, in particular processors of NFC-SIM cards recently commercialized and provided to be associated with an NFC controller as host processors. In such an embodiment, the inversion program PINVP1 is configured such that the host processor HP1 perceives, during a transaction with the passive reader RCIC, that it is in the presence of a true reader.

Figure 7:
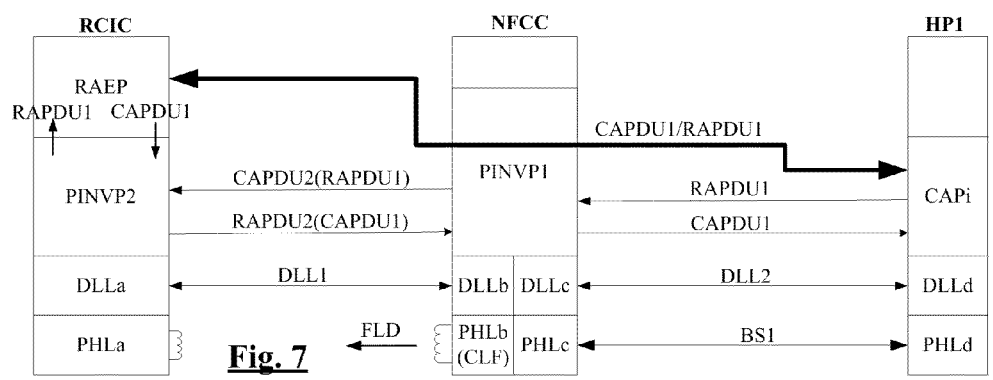
FIG. 7 shows a transaction between the NFC device of FIG. 5 and a passive reader according to an embodiment of the invention.

FIG. 7 shows an architecture of the NFC device and of the passive reader RCIC designed to this end, and shows a card application CAPi of the processor HP1 conducting a transaction with the passive reader RCIC. Each element RCIC, NFCC, HP1 includes communication layers shown in the form of a physical layer PHL and a data link layer DLL. Each physical layer PHL includes hardware and low-level protocol execution components for the emission and the reception of data (modulation and demodulation of signals, coding and decoding of data, and the like). A physical layer PHLa of the passive reader RCIC cooperates with a first physical layer PHLb of the controller NFCC, that is to say the interface CLF, to create an RF communication channel and to ensure the transmission and the reception of data in the RF channel. A second physical layer PHLc of the controller NFCC cooperates with a physical layer PHLd of the host processor HP1 to ensure the transmission of data on the bus BS1. The physical layers PHLc, PHLd are, for example, hardware components of management of an SWP bus and components of execution of a low-level protocol for the emission and the reception of data via the SWP bus.

Above the physical layers, a data link layer DLLa of the passive reader RCIC cooperates with a first data link layer DLLb of the controller NFCC, to form a data link layer ensuring the transport of data in the RF channel created by the physical layers PHLa and PHLb. The data link layer protocol depends upon the technology RFTi that is activated for the application during a transaction, for example Type A, Type B, Type B', or Type F, and is defined by the previously-mentioned specifications. A second data link layer DLLc of the controller NFCC cooperates with a data link layer DLLd of the host processor HP1 to form a data link DLL2 ensuring the transport of data between the controller NFCC and the host processor HP1. The layers DLLc, DLLd comprise for example SWP data link layers and HCI data link layers. As defined by the ETSI TS 102 622 specification, paragraph 4.1 FIG. 1, an HCI data link layer includes, for example, an HCI administration layer, an HCP routing layer ("HCP routing"), a message transport layer ("HCP messaging"), and a "gate layer" that includes the card application or reader application gates and the RF card and reader gates.

Finally, above the data link layers, the controller NFCC includes the inversion program PINVP1, the host processor HP1 includes at least one card application CAPi, and the passive reader RCIC includes a protocol inversion program PINVP2 cooperating with a "Reader Application Emulation Program" RAEP.

During a transaction with the passive reader RCIC, the inversion program PINVP1 configures the interface CLF in active mode to emit a magnetic field, allowing an RF channel to be established according to a technology RFTi with the passive reader RCIC. The inversion program PINVP1 then dialogues with the inversion program PINVP2 of the passive reader RCIC and addresses to the passive reader RCIC commands CAPDU2. It receives responses RAPDU2 emitted by the inversion program PINVP2 in which are encapsulated the commands CAPDU1 supplied by the program RAEP, destined for the host processor HP1. The inversion program PINVP1 de-encapsulates the commands CAPDU1 and communicates the commands CAPDU1 to the card application CAPi of the host processor HP1 via an HCI pipe by means of HCI commands. The inversion program PINVP1 then receives responses RAPDU1 emitted by the card application CAPi of the host processor HP1, via the HCI interface. It encapsulates them in commands CAPDU2 that it sends to the passive reader RCIC via the RF channel. The inversion program PINVP2 of the passive reader RCIC receives these commands, extracts from them the responses RAPDU1, and communicates them to the program RAEP for treatment, which then supplies a new command CAPDU1 and so forth until the transaction is achieved.

A command CAPDU generally includes fields "CLA", "INS", "P1", "P2", "Lc", "DATA", "Le". The field "DATA" is an optional data field. The encapsulation of responses RAPDU1 in commands CAPDU2 is done by the inversion program PINVP1 by inserting the responses RAPDU1 in the data field "DATA". Similarly, a response RAPDU generally comprises fields DATA, SW1, SW2, the field "DATA" also being an optional data field. The encapsulation of commands CAPDU1 in responses RAPDU2 is done by the inversion program PINVP2 by inserting these commands CAPDU1 in this data field "DATA".

The card application CAPi of the host processor HP1 thus receives, via the HCI interface, commands CAPDU1 that appear to be emitted by an NFC reader, and sends to the "virtual" reader responses CAPDU1. In FIG. 7, a link in bold shows a virtual link that is established between the card application CAPi of the host processor HP1 and the reader application emulation program RAEP of the passive reader RCIC, by the intermediary of inversion programs PINVP1, PINVP2.

Figure 8:
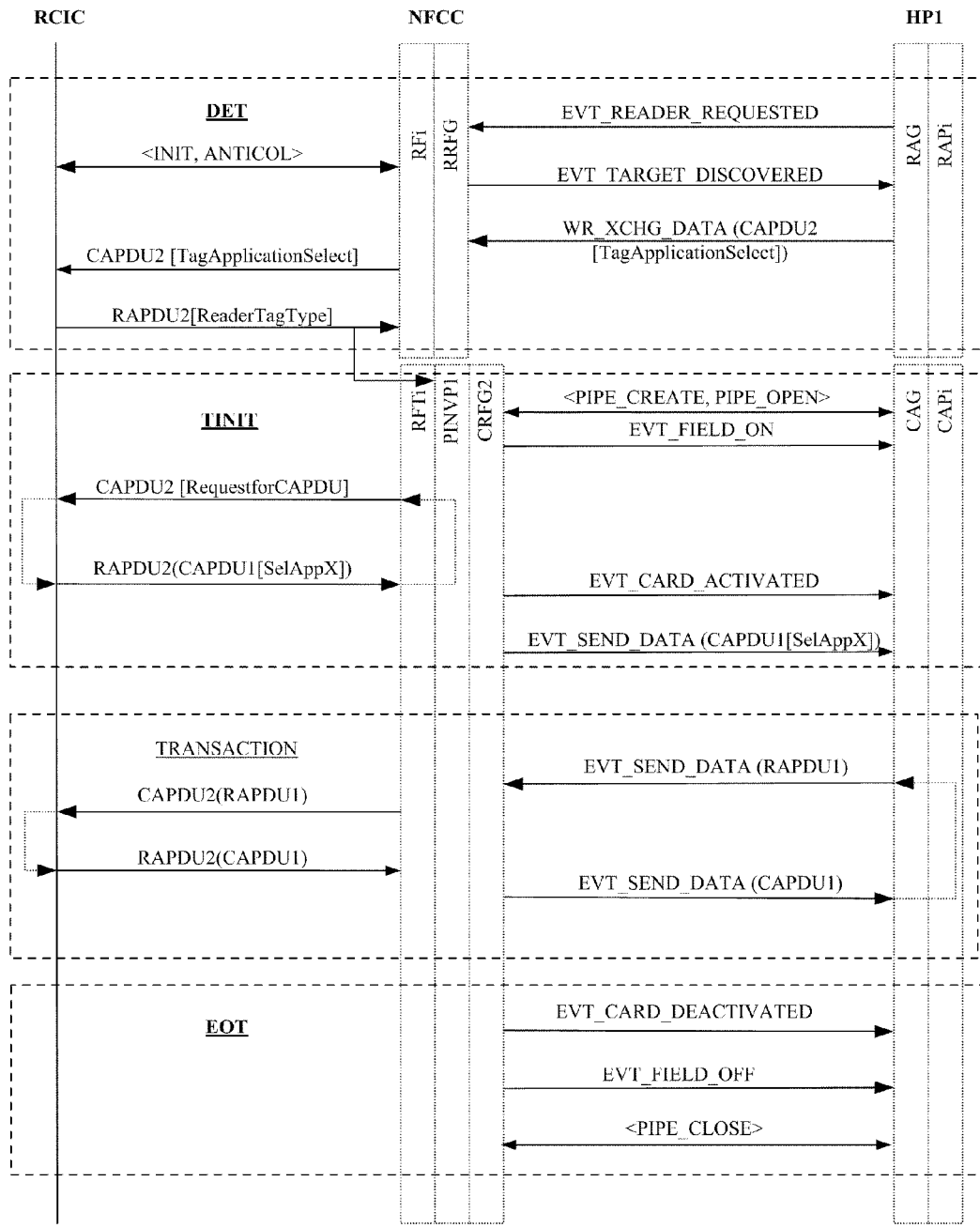
FIG. 8 shows steps of a transaction between the NFC device of FIG. 5 and a passive reader according to an embodiment of the invention.

FIG. 8 describes, in more detail, steps of a transaction between the host processor HP1 and the passive reader RCIC. This implementation example of the invention is based on the ETSI TS 102 622 specification in that it concerns the interface between the host processor HP1 and the controller NFCC.

A detection phase (DET) of the passive reader RCIC, a transaction initialization phase (TINIT), a transaction phase as such (TRANSACTION), and an end of transaction phase (EOT) can be distinguished.

The detection phase (DET) aims to detect the presence of the passive reader RCIC. As it does not emit a field, it must be detected as a conventional contactless integrated circuit, before it may be ascertained that it includes a reader application emulation program RAEP.

This preliminary detection phase may be implemented according to various methods. In one embodiment, the inversion program PINVP1 is permanently active and regularly requests that the interface CLI emit the magnetic field to detect the presence of a contactless integrated circuit, then tries to determine whether this contactless integrated circuit is a passive reader or not. In another embodiment, the detection of the passive reader RCIC is confided to a reader application RAPi situated in the host processor HP1 or any other host processor susceptible of being linked to the controller NFCC. This second method will now be described because it is in conformance with the NFC device architecture such as defined by the previously-cited ETSI specification, according to which the controller NFCC emits the magnetic field in response to commands supplied by host processors.

Detection Phase (DET)

It is assumed in the following that a reader application RAPi, executed here by the host processor HP1, has been activated beforehand and is linked to the controller NFCC by the intermediary of gates RAG, RRFG and of a pipe P1 (Cf. FIG. 5). The application RAPi regularly polls the surroundings of the NFC device by addressing to the controller NFCC the command EVT_READER_REQUESTED. When the passive reader RCIC is detected, the controller NFCC conducts initialization steps of an RF communication channel, optionally of anti-collision, and of activation of the integrated circuit RCIC (steps "INIT, ANTICOL"). The controller NFCC then sends to the application RAPi the command EVT_TARGET_DISCOVERED. The application RAPi then addresses the conventional application selection command "TagApplicationSelect" to the controller NFCC. The command is emitted in the form of command CAPDU2 ("CAPDU2[TagApplicationSelect]") and is addressed to the controller NFCC1, encapsulated in the command WR_XCH-G_DATA. The command CAPDU2 is transferred by the controller NFCC to the passive reader RCIC via the RF channel. The passive reader RCIC sends back a particular response RAPDU2, containing an information "ReaderTagType" signifying that it forms a passive reader. This particular response differs from conventional responses such as those defined by the NFCForum-TS-Type-4-Tag specification, table 3, section 5.2.2. This response may be a response without a data field containing a field SW1-SW2 different from that usually sent back by a contactless integrated circuit, for example the field SW1-SW2=9001h (hexadecimal notation) instead of the field SW1-SW2=9000h. In another embodiment, the response contains a standard field SW1-SW2 with a value 9000h, but it contains a determined data field signifying that the integrated circuit is of the passive reader type.

Transaction Initialization Phase (TINIT)

The particular response RAPDU2 causes the inversion program PINVP1 to be activated by the controller NFCC. The inversion program PINVP1 then activates the card RF gate CRFG2 and generates an associated registry such as that described by ETSI TS 102 622 point 9.3.3.4. This volatile registry contains parameters of the RF channel that the card application must know. The creation and the utilization of this registry will not be further described here and are within the purview of the skilled person. It will however be noted that the inversion program PINVP1 may store in the registry RF channel parameters that do not correspond to those of the RF channel that was created by the controller NFCC to access the passive reader RCIC. Thus, besides its NFC reader emulation function, the inversion program PINVP1 may allow for the emulation of an RF technology in relation to the card application CAPi, in particular if the application is not compatible with the RF technology of the passive reader RCIC.

For example, during the detection phase, the reader application RAPi may have detected the passive reader RCIC using type A protocol. However, the card application CAPi may be configured to dialogue with type B readers. In one embodiment, the protocol inversion program PINVP1 retrieves the protocol type supported by the card application CAPi from the NFCC controller registry. Then, the protocol inversion program PINVP1 embeds or encapsulates this information in a command CAPDU2[RequestforCAPDU] described below, which is sent to the passive reader RCIC. Then, the reader application emulation program RAEP of the passive reader RCIC uses type B protocol for communicating with the card application CAPi, whereas the protocol inversion programs PINVP1 and PINVP2 continue to exchange data using the type A protocol. Therefore, the transport protocol used between the passive reader RCIC and the contactless interface CLF of the controller NFCC is "transparent" for the card application CAPi and the reader application emulation program RAEP.

Once the card RF gate CRFG2 has been activated, the inversion program PINVP1 requests the HCI administrator to open the pipe P3 between the gate CAG of the card application CAPi and the gate CRFG2 (steps "PIPE_CREATE, PIPE_OPEN"). The inversion program then sends the command EVT_FIELD_ON to the card application CAPi to make it believe that an NFC reader emitting a magnetic field has been detected.

The initialization phase then comprises the sending, by the inversion program PINVP1, of a command CAPDU2 of the type CAPDU2[RequestforCAPDU] forming a request for the supply of a first reader application command CAPDU1. The passive reader RCIC responds for example by means of a response of the type RAPDU2(CAPDU1[SelAppX]), within which is encapsulated a command CAPDU1 that designates the application "X" to select ("SelAppX"). Upon reception of the response RAPDU2, the inversion program PINVP1 de-encapsulates the command CAPDU1, addresses to the card application CAPi the command EVT_CARD_ACTIVATED that signifies that the application should become active, then address to it the command CAPDU1[SelAppX] encapsulated in the command "EVT_SEND_DATA".

Transaction Phase (TRANSACTION)

The transaction phase as described above in relation with FIG. 7. It comprises the exchange of commands CAPDU1 and of responses RAPDU1 between the card application CAPi and the reader application emulation program RAEP. More precisely, in response to the command CAPDU1[SelAppX] received at the end of the initialization phase, the card application CAPi sends back a first response RAPDU1, then the program RAEP sends back a command CAPDU1, and so forth until the end of the transaction. The commands CAPDU1 and the responses RAPDU1 are respectively encapsulated in responses RAPDU2 and commands CAPDU2 when they are transmitted in the RF channel, and encapsulated in HCP commands "EVT_SEND_DATA" when they are transmitted in the pipe P3 of the HCI interface. The inversion program PINVP1 takes responsibility for the encapsulation of responses RAPDU1 in commands CAPDU2 and for the de-encapsulation of commands CAPDU1 present in the responses RAPDU2. The card RF gate CRFG2 takes responsibility for the encapsulation of commands CAPDU1 and of responses RAPDU1 in commands "EVT_SEND_DATA".

End of Transaction Phase (EOT)

The transaction finishes by the sending of particular command CAPDU2 by the passive reader RCIC or by the absence of the sending of a new command by it. The inversion program PINVP1 thus ensures the closing of the RF channel by asking the host processor HP1 to stop emitting the field and addresses to the reader application CAPi the commands "EVT_CARD_DEACTIVATED" then "EVT_FIELD_OFF". The pipe P3 is then closed (step <PIPE_CLOSE>).

In the preceding, an embodiment of the invention wherein the inversion program PINVP1 is executed by the host controller HC of the controller NFCC has been described. In other embodiments, the inversion program may be executed by another unit of the NFC device, for example a second host processor HP2, which thus acts as an intermediary between the controller NFCC and the host processor HP1. Such an embodiment will now be described.

Inversion Program Executed by a Host Processor

Figure 9:
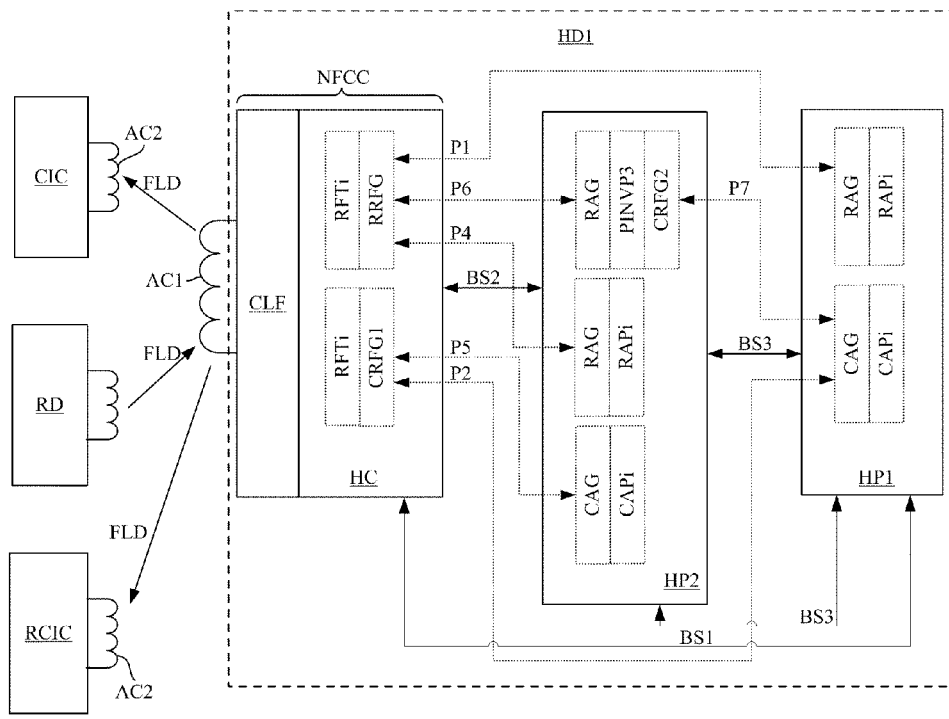
FIG. 9 shows the architecture of another embodiment of an NFC device according to an embodiment of the invention.

FIG. 9 shows another embodiment of an NFC device according to an embodiment of the invention, integrated in a portable device HD. The NFC device comprises the controller NFCC, the host processor HP1, and a second host processor HP2. The host processor HP2 is linked to the controller NFCC by a bus BS2, for example an asynchronous bus linking Universal Asynchronous Receiver Transmitter (UART) interfaces of the controller NFCC and of the host processor HP2. The host processor HP1 is linked to the controller NFCC by the bus BS1 described above, and to the host processor HP2 by a bus BS3, for example an ISO 7816 bus. The processor HP2 is for example a mobile telephone baseband processor and the processor HP1 a secure processor, such as a SIM card processor.

The controller NFCC includes a contactless interface CLF equipped with an antenna coil AC1 and a host controller HC. It is assumed as previously, in a non-limiting manner, that the host processor HP1 presents all the functionalities of a conventional NFC controller, in particular that it may implement one or more RF technologies RFTi, and that it is configured to activate a reader RF gate RRFG or a card RF gate CRFG1 to allow the host processors HP1, HP2 to execute reader applications RAPi and card applications CAPi. It is also assumed that the host processors HP1, HP2 each include at least one card application CAPi and a reader application RAPi. Thus, the NFC device may conduct a transaction with a conventional contactless integrated circuit CIC by opening a pipe P1 between a reader application RAPi executed by the host processor HP1 and a technology RFTi, or a pipe P4 between a reader application RAPi executed by the host processor HP2 and a technology RFTi, by the intermediary of gates RAG and RRFG. It may equally conduct a transaction with a conventional reader RD by opening a pipe P2 between a card application CAPi executed by the host processor HP1 and a technology RFTi, or a pipe P5 between a card application CAPi executed by the host processor HP2 and a technology RFTi, by the intermediary of gates CAG and CRFG1.

Additionally, the host processor HP2 also includes a program inversion protocol PINVP3 according to embodiments of the invention. This inversion program PINVP3 is configured to establish a communication with a passive reader RCIC according to an embodiment of the invention, by the intermediary of a technology RFTi and of the interface CLF, receive from the passive reader RCIC commands CAPDU1, and communicate them to the host processor HP1 as if they were commands received by a true NFC reader. It is also configured to receive from the host processor HP1 responses RAPDU1 to such commands, and to supply them to the passive reader RCIC for treatment. To this end, the inversion program PINVP3 is configured to activate a reader application gate RAG and to request the HCI administrator to open a pipe P6 linking the gate RAG to a reader RF gate RRFG associated with a technology RFTi. The inversion program PINVP3 is also configured to activate a card RF gate CRFG2 and to request from the HCI administrator the opening of a pipe P7 linking the card RF gate CRFG2 to a gate CAG of a card application CAPi executed by the host processor HP1.

Figure 10:
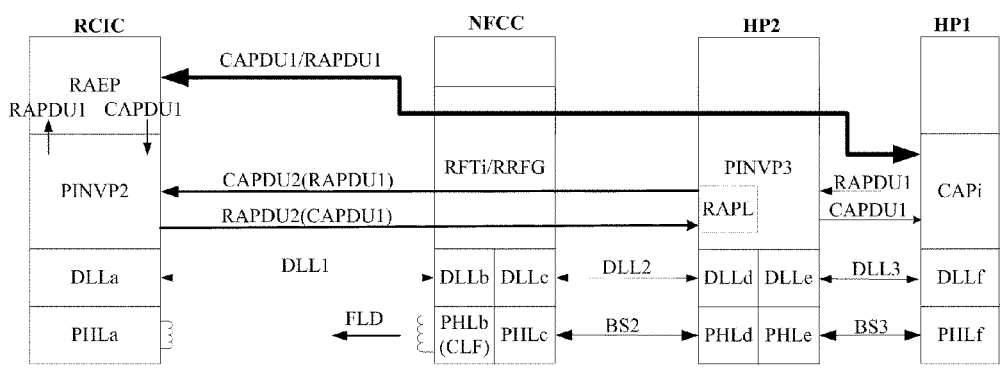
FIG. 10 shows a transaction between the NFC device of FIG. 9 and a passive reader according to the invention.

FIG. 10 is an ensemble view of an architecture of an NFC device and of the passive reader RCIC allowing the card application CAPi of the processor HP1 to conduct a transaction with the passive reader RCIC, by the intermediary of the processor HP2 and of the controller NFCC. Each element RCIC, NFCC, HP1, HP2 includes a physical layer PHL and a data link layer DLL. A physical layer PHLa of the passive reader RCIC cooperates with a first physical layer PHLb of the controller NFCC, that is the interface CLF, to create an RF communication channel and to ensure the transmission and the reception of data in the RF channel. A second physical layer PHLc of the controller NFCC cooperates with a first physical layer PHLd of the host processor HP2 to ensure the transmission of data on the bus BS2. The physical layers PHLc, PHLd are, for example, UART interfaces. A second physical layer PHLe of the host processor HP2 cooperates with the physical layer PHLf of the host processor HP1 to ensure the transmission of data on the bus BS2. The physical layers PHLe, PHLf are for example ISO 7816 bus interfaces.

Similarly, a data link layer DLLa of the passive reader RCIC cooperates with a first data link layer DLLb of the controller NFCC, to form a data link DLL1 ensuring the transport of data in the RF channel created by the physical layers PHLa and PHLb, according to a technology RFTi (for example of the Type A, B, B', or F). A second data link layer DLLc of the controller NFCC cooperates with a first data link layer DLLd of the host processor HP2 to form a data link DLL2 ensuring the transport of data between the controller NFCC and the host processor HP2. The data link layers DLLc, DLLd comprise for example an asynchronous data link data link layer and an HCI data link layer. Finally, a second data link layer DLLe of the host processor HP2 cooperates with a data link layer DLLf of the host processor HP1 to form a data link DLL3 ensuring the transport of data between the host processor HP2 and the host processor HP1. The data link layers DLLe, DLLf comprise for example an ISO 7816 data link layer and an HCI data link layer.

Finally, above the data link layers, the controller NFCC includes a technology RFTi and a reader RF gate RRFG, the host processor HP2 comprises the inversion program PINVP3, and the host processor HP1 comprises a card application CAPi. The passive reader RCIC includes, as previously, the inversion program PINVP2 cooperating with the reader application emulation program RAEP.

The inversion program PINVP3 includes a function RAPL (sub-program) forming the equivalent of a reader application, to detect and establish a communication with the passive reader RCIC as a contactless integrated circuit, by the intermediary of the controller NFCC. Thus, by means of the function RAPL, the inversion program PINVP3 configures the interface CLF in active mode to emit a magnetic field and establish an RF channel with the passive reader RCIC according to a technology RFTi. The inversion program PINVP3 then dialogues with the inversion program PINVP2 of the passive reader RCIC and addresses to it commands CAPDU2. It receives responses RAPDU2 emitted by the inversion program PINVP2 within which are encapsulated the commands CAPDU2 supplied by the program RAEP. It de-encapsulates the commands CAPDU1 and communicates them to the card application CAPi of the host processor HP1 via the pipe P7 of the HCI interface. The inversion program PINVP3 then receives responses RAPDU1 emitted by the card application CAPi of the host processor HP1, via the pipe P7 of the HCI interface. It encapsulates them in commands CAPDU2 that it sends to the passive reader RCIC via the pipe P6 of the HCI interface and the RF channel. The inversion program PINVP2 receives these commands, extracts from them the responses RAPDU1, and communicates them to the program RAEP for treatment, which then supplies a new command CAPDU1 and so forth until the transaction is achieved.

Figure 11:
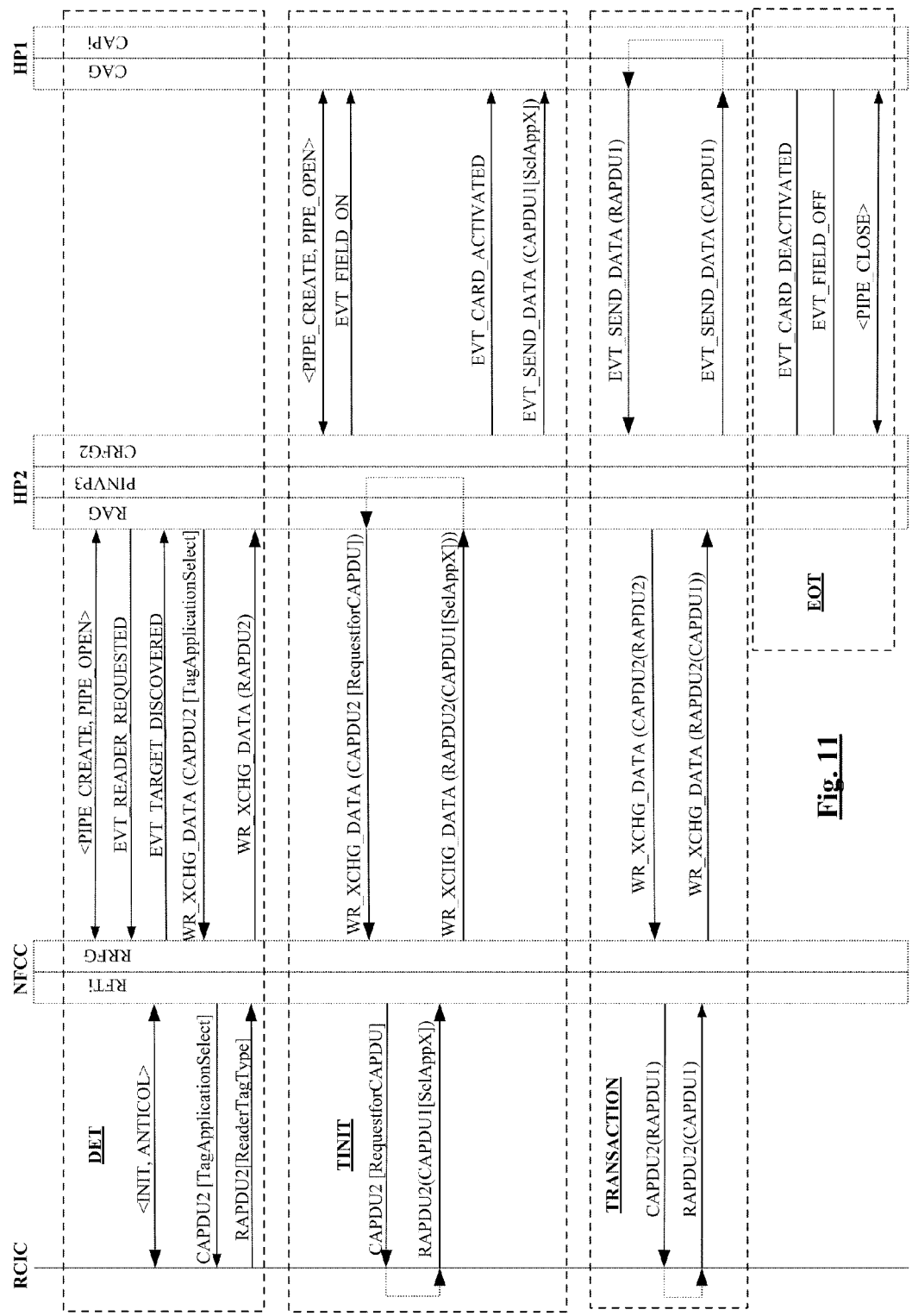
FIG. 11 shows steps of a transaction between the NFC device of FIG. 9 and a passive reader according to the invention.

FIG. 11 describes, in further detail, steps of a transaction between the host processor HP1 and the passive reader RCIC. A detection phase (DET) of the passive reader RCIC, a transaction initialization phase (TINIT), a transaction phase as such (TRANSACTION), and an end of transaction phase (EOT) can be distinguished.

It is assumed in this implementation example that the inversion program PINVP3 is configured to detect itself the presence of the passive reader RCIC, via the function RAPL, by cyclically addressing HCI commands "EVT_READER_REQUESTED" to the controller NFCC. Nevertheless, the detection phase of the passive reader RCIC could also be conducted by a reader application of the host processor HP2, or even a reader application of the host processor HP1. In this case, the detection of the passive reader RCIC would cause the activation of the inversion program PINVP3.

Detection Phase (DET)

The detection phase thus includes the preliminary activation of the inversion program PINVP3 and the creation of the pipe P6 between the program PINVP3 and the controller NFCC, via a reader application gate RAG (Cf. FIG. 9), by steps "PIPE_CREATE, PIPE_OPEN". Then, the inversion program PINVP3 regularly polls the surroundings of the NFC device by sending the command EVT_READER_REQUESTED to the controller NFCC. When the passive reader RCIC is detected, the controller NFCC conducts RF communication channel initialization steps, and optionally of anti-collision, and of activation of the integrated circuit (steps "INIT, ANTICOL"). The controller NFCC then sends to the reader application RAPi the command EVT_TARGET_DISCOVERED. The inversion program PINVP3 then addresses to the controller NFCC an application selection command "TagApplicationSelect". The command is of the type ("CAPDU2[TagApplicationSelect]") and is encapsulated in the command WR_XCHG_DATA in the pipe P6. The command CAPDU2 is transferred by the controller NFCC to the passive reader RCIC via the RF channel. The passive reader RCIC sends back a particular response RAPDU2 containing an information "ReaderTagType" signifying that it forms a passive reader. As indicated above, this particular response RAPDU2 differs from a conventional contactless integrated circuit response. It may be a response containing a field SW1-SW2 different than that usually sent back by a contactless integrated circuit, for example SW1-SW2=9001h (hexadecimal notation), or a response containing a standard field SW1-SW2 of value 9000h and a determined data field signifying that the integrated circuit is of the passive reader type. This particular response RAPDU is communicated to the inversion program PINVP3 by means of the command WR_XCHG_DATA via the pipe P6.

Transaction Initialization Phase (TINIT)

The particular response RAPDU causes the inversion program PINVP3 to activate the card RF gate CRFG2 as well as an associated registry containing parameters of the RF channel. As previously, the inversion program PINVP3 may set, in this registry, parameters of the RF channel that do not correspond to those of the RF channel that was created by the controller NFCC to access the passive reader RCIC.

The inversion program PINVP3 then requests the HCI administrator to open the pipe P7 linking the gate CRFG2 to the gate CAG of the card application CAPi of the host processor HP1 (steps "PIPE_CREATE, PIPE_OPEN"). The inversion program PINVP3 then sends the command EVT_FIELD_ON to the card application CAPi to make it believe that an NFC reader emitting a magnetic field has been detected.

The initialization phase also includes the sending to the passive reader RCIC of a command CAPDU2 of the type CAPDU2[RequestforCAPDU] forming a request for the supply of a reader application command CAPDU1. The inversion program PINVP3 sends this command to the controller NFCC via the pipe P6 by means of a command WR_XCHG_DATA and the host processor HP1 sends it to the passive reader RCIC. The passive reader RCIC responds by means of a response of the type RAPDU2(CAPDU1[SelAppX]) within which is encapsulated a command CAPDU1. The command CAPDU1 is for example a selection command of an application "X" to select ("SelAppX"). The response RAPDU2 containing the command CAPDU1 is transmitted to the inversion program PINVP3 via the pipe P6 in encapsulated form in a command WR_XCHG_DATA. Upon reception of the response RAPDU2, the inversion program PINVP3 de-encapsulates the command CAPDU1, addresses the command EVT_CARD_ACTIVATED via the pipe P7 to the card application CAPi, then addresses to it the command CAPDU1[SelAppX] encapsulated in the command "EVT_SEND_DATA".

Transaction Phase (TRANSACTION)

The transaction phase described above in relation with FIG. 10 includes the exchange of commands CAPDU1 and of responses RAPDU1 between the card application CAPi and the reader application emulation program RAEP. More precisely, in response to the command CAPDU1[SelAppX] received at the end of the initialization phase, the card application CAPi sends back a first response RAPDU1, then the reader application emulation program RAEP of the passive reader RCIC sends back a command CAPDU1, and so forth until the end of the transaction.

The commands CAPDU1 and the responses RAPDU1 are respectively encapsulated in responses RAPDU2 and commands CAPDU2 when they are transmitted in the RF channel. The responses RAPDU2 and the commands CAPDU2 are themselves encapsulated in commands WR_XCHG_DATA when they circulate in the pipe P6 between the controller NFCC1 and the inversion program PINVP3. The responses RAPDU1 and the commands CAPDU1 are encapsulated in commands EVT_SEND_DATA when they circulate in the pipe P7 between the inversion program PINVP3 and the card application CAPi. The reader application gate RAG of the inversion program PINVP3 takes responsibility for the encapsulation of commands CAPDU2 in commands "WR_XCHG_DATA" and for the de-encapsulation of responses RAPDU1 present in the commands WR_XCHG_DATA. The inversion program PINVP1 takes responsibility for the encapsulation of responses RAPDU1 in commands CAPDU2 and the de-encapsulation of commands CAPDU1 present in the responses RAPDU2. The card RF gate CRFG2 takes responsibility for the encapsulation of commands CAPDU1 and of responses RAPDU1 in commands "EVT_SEND_DATA" (FIG. 9).

End of Transaction Phase (EOT)

The transaction finishes by the sending of a particular command CAPDU2 by the passive reader RCIC or by the absence of the sending of a new command by it. The inversion program PINVP3 thus ensures the closing of the RF channel by asking the host processor HP1 to stop emitting the field, and addresses to the reader application CAPi the HCP commands "EVT_CARD_DEACTIVATED", then "EVT_FIELD_OFF". The pipe P7 between the gates CRFG2 and CAG is then closed (step <PIPE_CLOSE>).

Other Embodiments and Applications

It will clearly appear to the skilled person that embodiments of the present invention are susceptible of diverse applications. In a general manner, a passive reader RCIC is susceptible of being integrated in any type of portable or fixed device. The terms "card", "contactless chip card", or "tag" have the same signification and designate a support equipped with a passive reader RCIC. A passive reader destined to be used as a reader and not as an integrated circuit of a contactless chip card, is not necessarily integrated in a portable support and may be arranged in or on a fixed support, for example, payment gates or access control. Equally, even though such a passive reader has been presented as a contactless integrated circuit, the term "contactless" designates the communication interface that a passive reader uses to exchange data with the NFC device and does not in any way signify that the integrated circuit cannot be equipped with contacts. The passive reader RCIC may also be realized by means of an integrated circuit called "combi" comprising both a contact communication interface (for example ISO 7816 contacts) and a contactless communication interface.

Moreover, the term "passive" should not be interpreted as signifying that a contactless integrated circuit forming a passive reader according to the invention does not include any capability for emitting a magnetic field and/or that it does not emit any magnetic field during a transaction. Indeed, according to the operating principle of the card emulation mode such as described by EP 1 327 222 (U.S. Pat. No. 7,098,770), a passive charge modulation may also be emulated by short duration emissions of the magnetic field, that are perceived by the entity emitting the principal field as charge modulation signals. The term "passive" therefore simply signifies that a passive reader RCIC according to the invention does not emit the principal magnetic field that allows the transaction to be conducted, as opposed to a conventional reader.

In addition, the term "transaction" may designate any type of communication or of exchange of data, and does not exclusively designate a financial transaction or a transaction involving a payment.

In the preceding, embodiments of the invention have been described that are compatible with the NFC Forum specifications as far as the communication interface between the NFC device and the passive reader RCIC is concerned, this compatibility being in particular ensured thanks to the encapsulation of commands and responses CAPDU1 and RAPDU1 in responses and commands RAPDU2 and CAPDU2 circulating in the RF channel. Similarly, embodiments of the invention have been described that are compatible with the ETSI specification concerning the communication interface between the controller NFCC and the host processor HP1 (first embodiment), or concerning the communication interface between the controller NFCC1 and the host processors HP1, HP2 and between the host processors HP1, HP2 themselves (second embodiment), thanks to the use of HCI pipes and HCP commands. The invention may however be implemented in a different manner in applications where it is not necessary or desirable to ensure the compatibility with such specifications. Thus, in embodiments of the invention, the passive reader RCIC may supply commands CAPDU1 that are not encapsulated in responses RAPDU2 to commands CAPDU2 sent by the NFC device and the controller NFCC1 may send to the passive reader RCIC responses RAPDU1 that are not encapsulated in commands CAPDU2. Similarly, the inversion programs PINVP1 or PINVP3 may transfer to the host processor HP1 commands supplied by the passive reader RCIC without encapsulating them in HCI commands. Equally, the commands and the responses may not be in the APDU format and may have any format that may be envisaged by the skilled person. In such embodiments, a protocol is provided to distinguish on the one hand the commands and responses (CAPDU2, RAPDU2) that allow for the management of the communication between the inversion program PINVP1 or PINVP3 of the NFC device and the inversion program PINVP2 of the passive reader RCIC, and on the other hand commands and responses (CAPDU1, RAPDU1) relative to the transaction between the emulation program RAEP of the passive reader and the card application of the host processor HP1. This protocol allows the inversion program PINVP1 or PINVP3 of the NFC device and the inversion program PINVP2 of the passive reader RCIC to differentiate between the commands or the responses that are for them and the commands or the responses that they must transfer to the higher-level programs, respectively the card application CAPi and the emulation program RAEP.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of conducting a transaction between a Near Field Communication (NFC) device and a passive contactless integrated circuit, the NFC device comprising an NFC controller coupled to a contactless communication interface, and at least a first host processor comprising at least one card application program, the method comprising:

providing, in an intermediary unit, a first protocol inversion program, wherein the intermediary unit of the NFC device:

sets the contactless communication interface in an active mode wherein the interface emits a magnetic field and establishes a communication with the contactless integrated circuit, receives, from the contactless integrated circuit, first reader application commands and transferring the first reader application commands to the first host processor, and receives, from the first host processor, first card application responses and transferring the first card application responses to the contactless integrated circuit;

providing, in the contactless integrated circuit, at least one reader application emulation program configured to supply first reader application commands and to treat first card application responses; and providing, in the contactless integrated circuit, a second protocol inversion program configured to cooperate with the reader application emulation program;

establishing, between the first and the second inversion programs, a contactless communication wherein the intermediary unit acts as a reader relative to the contactless integrated circuit; and by an intermediary of the second and the first inversion programs:

transferring to the first host processor, first reader application commands supplied by the reader application emulation program, and transferring to the reader application emulation program, first card application responses supplied by the card application of the first host processor.

2. The method of claim 1, further comprising, by the intermediary unit:

receiving from the first host processor, first card application responses, encapsulating the first card application responses in second reader application commands, and transferring the second reader application commands to the contactless integrated circuit; and receiving from the contactless integrated circuit, first reader application commands encapsulated in second card application responses, de-encapsulating the first reader application commands, and transferring the first reader application commands to the first host processor.

3. The method of claim 2, wherein the second reader application commands and the second card application responses are in the APDU ISO 7816 format.

4. The method of claim 1, wherein the first reader application commands emitted by the reader application emulation program and the first card application responses emitted by the card application program are in the Application Protocol Data Unit (APDU) ISO 7816 format.

5. The method of claim 1, further comprising supplying to the first host processor, by the intermediary unit, Host Controller Interface (HCI) commands that cause the first host processor to perceive that the first reader application commands received from the contactless integrated circuit are emitted by an NFC reader in the active mode.

6. The method of claim 1, further comprising recording in a registry at the disposal of the first host processor, Radio Frequency (RF) channel parameters that cause the first host processor to perceive that the first reader application commands received from the contactless integrated circuit as having been emitted by an NFC reader in the active mode.

7. The method of claim 1, wherein the intermediary unit is a host controller of the NFC device.

8. The method of claim 1, wherein the intermediary unit is a second host processor of the NFC device.

* * * * *